(12) United States Patent
Kim et al.

(10) Patent No.: US 10,096,848 B2
(45) Date of Patent: Oct. 9, 2018

(54) AIR CUT-OFF VALVE MODULE AND CONTROL METHOD THEREOF

(71) Applicant: HYUNDAI KEFICO CORPORATION, Gunpo, Gyeonggi-do (KR)

(72) Inventors: Myoung Jin Kim, Gyeonggi-do (KR); Dong Bin Shin, Gyeonggi-do (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 0 days.

(21) Appl. No.: 15/841,716

(22) Filed: Dec. 14, 2017

(65) Prior Publication Data
US 2018/0175414 A1  Jun. 21, 2018

(30) Foreign Application Priority Data

Dec. 15, 2016  (KR) .................. 10-2016-0171653

(51) Int. Cl.
| | |
|---|---|
| *B60K 6/32* | (2007.10) |
| *H01M 8/04082* | (2016.01) |
| *B60L 11/00* | (2006.01) |
| *B60L 11/18* | (2006.01) |
| *B60K 1/04* | (2006.01) |

(52) U.S. Cl.
CPC .......... *H01M 8/04201* (2013.01); *B60K 6/32* (2013.01); *B60L 11/002* (2013.01); *B60L 11/1883* (2013.01); *B60L 11/1898* (2013.01); *B60K 2001/0455* (2013.01); *B60Y 2200/91* (2013.01); *B60Y 2200/92* (2013.01); *B60Y 2400/202* (2013.01); *H01M 2250/20* (2013.01)

(58) Field of Classification Search
CPC ............ H01M 8/04; H01M 8/00; H01M 8/02; H01M 8/04044; H01M 8/04082
See application file for complete search history.

(56) References Cited

U.S. PATENT DOCUMENTS

| | | | | |
|---|---|---|---|---|
| 6,135,415 | A * | 10/2000 | Kloda .................. | F02M 26/21 |
| | | | | 123/568.18 |
| 2013/0202979 | A1* | 8/2013 | Katano ............. | H01M 8/04761 |
| | | | | 429/444 |
| 2015/0072259 | A1* | 3/2015 | Furukoshi ......... | H01M 8/04029 |
| | | | | 429/436 |

(Continued)

FOREIGN PATENT DOCUMENTS

| | | |
|---|---|---|
| JP | 50-128722 U1 | 10/1975 |
| JP | H10121996 A | 5/1998 |
| JP | 2013149538 A | 8/2013 |

(Continued)

*Primary Examiner* — John D Walters
*Assistant Examiner* — James J Triggs
(74) *Attorney, Agent, or Firm* — Mintz Levin Cohn Ferris Glovsky and Popeo, P.C.; Kongsik Kim; Jhongwoo Jay Peck

(57) ABSTRACT

An air cut-off valve module and a control method thereof is provided. The air cut-off valve module has a structure in which valve plates and driving mechanisms thereof are formed as one module, and is mounted in a stack. Thus, components related to the air cut-off valve are constructed as a compact module. Furthermore, a bypass flow path is formed to dilute exhaust gas of the stack, thereby reducing the concentration of hydrogen.

13 Claims, 7 Drawing Sheets

(56) References Cited

U.S. PATENT DOCUMENTS

2016/0141661 A1* 5/2016 Kim .................. H01M 8/04201
429/455
2018/0166712 A1* 6/2018 Park .................. H01M 8/04089

FOREIGN PATENT DOCUMENTS

KR    10-2011-0079938 A    7/2011
KR       20160057115 A    5/2016

* cited by examiner

AIR CUT-OFF VALVE MODULE AND CONTROL METHOD THEREOF

CROSS-REFERENCE TO RELATED APPLICATION

This application claims priority to Korean Patent Application No. 10-2016-0171653, filed on Dec. 15, 2016, the disclosure of which is incorporated herein by reference in its entirety.

TECHNICAL FIELD

The present disclosure relates to an air cut-off valve module and a control method thereof, and more particularly, to an air cut-off valve module for opening or closing an air supply pipe and air discharge pipe of a stack in a fuel cell vehicle, and a control method thereof.

RELATED ART

Generally, a fuel cell vehicle refers to a vehicle using a motor driven by power generated from a fuel cell stack. The fuel cell stack produces electricity by reacting hydrogen with oxygen in the air, and the reaction generates water (e.g., steam) and heat. As illustrated in FIG. 1, a stack 1 is coupled to an air supply pipe 2 and an air discharge pipe 3. The air supply pipe 2 has a compressor (e.g., blower) 4 disposed thereon to smoothly supply external air to the stack 1. The supplied air is humidified through a humidifier 5, and supplied into the stack 1 to maintain a wet state of an electrolyte membrane in the stack 1. Therefore, migration of hydrogen ions from a fuel electrode to an air electrode is actively performed to promote an electrochemical reaction of the stack.

The air which is not used for the reaction in the stack 1 is discharged to the exterior environment through the air discharge pipe 3. The air discharged through the air discharge pipe 3 is also passed through the humidifier 5. The air supply pipe 2 and the air discharge pipe 3 have air cut-off valves 6 and 7 disposed thereon, respectively. When the operation of the stack 1 is stopped, outside air is diffused into the stack 1 or specifically the air electrode through the air supply pipe 2 and the air discharge pipe 3, and thus cause an unnecessary reaction. The air cut-off valves 6 and 7 serve to obstruct the outside air, thereby preventing a reduction in durability of the stack due to the unnecessary reaction.

In the related art, the air cut-off valves 6 and 7 are disposed on the air supply pipe 2 and the air discharge pipe 3, respectively, and have their own drivers. Thus, the sizes of components related to the air cut-off valves 6 and 7 are inevitably increased while the structures thereof have an increased complexity. Furthermore, when the air cut-off valves 6 and 7 are separated from the stack 1, the air between the stack 1 and the air cut-off valves 6 and 7 is introduced into the stack 1 even though the air cut-off valves 6 and 7 are closed when the operation of the stack 1 is stopped. In particular, the introduced air creates an unnecessary reaction. Moreover, in the related art, when the air cut-off valves 6 and 7 are opened during startup of the stack 1, hydrogen-containing air in the stack 1 is discharged through the air discharge pipe 3. In particular, the hydrogen concentration of exhaust gas exceeds the regulation standard. In order to prevent a fire, the hydrogen concentration of exhaust gas is typically regulated to less than 4%.

The above information disclosed in this section is merely for enhancement of understanding of the background of the disclosure and therefore it may contain information that does not form the prior art that is already known in this country to a person of ordinary skill in the art.

SUMMARY

The present disclosure provides an air cut-off valve module which may be constructed as a compact module for components related to an air-cut off valve of a stack, to prevent a reduction in durability of the stack due to air between the air-cut off valve and the stack when an operation of the stack is stopped, and reduce the concentration of hydrogen gas discharged through an air discharge path when the stack is started. Additionally, a control method of an air cut-off valve module, may reduce the concentration of hydrogen gas discharged through an air discharge path using the air cut-off valve module, when the stack is started.

In an aspect of an exemplary embodiment of the present disclosure, an air cut-off valve module of a vehicle fuel cell system having a fuel cell stack installed therein may include a sub housing having an air inlet and an air outlet separated from each other, and disposed in the stack to position the air inlet and the air outlet thereof to align with an air inlet and outlet of the stack, a main housing coupled to the sub housing, having an inlet pipe-side cavity communicating with the air inlet and an outlet pipe-side cavity communicating with the outlet of the sub housing, respectively, and including an inlet pipe and outlet pipe communicating with the respective cavities, a housing cover disposed on the main housing, and having a bypass flow path connecting the inlet pipe-side cavity and the outlet pipe-side cavity and valve plates disposed in the inlet pipe-side cavity and the outlet pipe-side cavity of the main housing, respectively, and opening or closing the inlet and outlet of the sub housing and an inlet and outlet of the bypass flow path. When the stack is stopped, the inlet and outlet of the sub housing may be obstructed by the valve plates, and when the stack is started, the valve plates may be partially (e.g., half) opened, and the inlet and outlet of the sub housing and the inlet and outlet of the bypass flow path may be opened (e.g., fully opened).

In some exemplary embodiments, the air cut-off valve module may include the main housing, sub housing mounting components that protrude from edges of the respective openings, and the inlet and outlet of the sub housing are inserted into the respective sub housing mounting components and exposed to the inlet pipe-side cavity and the outlet pipe-side cavity. The air cut-off valve module may include a shaft installed through the inlet pipe-side cavity and the outlet pipe-side cavity of the main housing. The valve plates may be disposed on the shaft.

In other exemplary embodiments, the main housing may include a motor insertion component formed at one side thereof, and a motor for driving the valve plates through the shaft may be inserted into the motor insertion component. The motor may have a pinion gear disposed on an output shaft thereof, and the shaft may have a segment gear disposed at one end thereof. The segment gear may be engaged with the pinion gear.

Additionally, the motor may have an output shaft coupled to a gear set that reduces the number of rotations and increases a torque. The gear set may have a pinion gear disposed on an output shaft thereof. The shaft may have a segment gear disposed at one end thereof and the segment gear may be engaged with the pinion gear. The air cut-off valve may have the gear set that includes a planetary gear set.

In other exemplary embodiments, the air cut-off valve module may include a controller disposed at one side of the main housing and configured to control the operation of the motor while communicating with a fuel cell control unit of the vehicle fuel cell system. The air cut-off valve module may include valve plates that have a sealing member attached thereon. The air cut-off valve module may include after the stack startup is terminated, the motor may be driven to control the valve plates to obstruct the inlet and outlet of the bypass flow path to supply air introduced from an exterior to the stack through the inlet of the sub housing.

In accordance with another aspect of the present disclosure, a control method of an air cut-off valve module of a vehicle fuel cell system having a fuel cell stack installed therein may include obstructing an air inlet and an air outlet when a motor is driven to control valve plates to block an inlet and outlet of a sub housing, when the stack is stopped and partially (e.g., half) opening a valve when the motor is driven to partially open the valve plates when the stack is started, and the inlet and outlet of the sub housing and a bypass flow path are opened to bypass a portion of air introduced from outside, to mix the bypassed air with air discharged from the outlet of the sub housing and reduce the hydrogen concentration of exhaust gas.

In some exemplary embodiments, the control method may include obstructing a bypass flow path when after the stack startup is terminated, the motor is driven to control the valve plates to block the inlet and outlet of the bypass flow path, to supply the air introduced from outside to the stack through the inlet of the sub housing. In other exemplary embodiments, hydrogen of the stack may be purged between obstructing the air inlet and outlet and partially opening the valve.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present disclosure may be modified in various manners and have a variety of embodiments. Thus, specific embodiments will be described in detail with reference to the accompanying drawings. However, the present disclosure is not limited to specific embodiments, and may include all variations, equivalents and substitutes within the scope of the present disclosure. It should be noted that the drawings are not to precise scale and may be exaggerated in thickness of lines or sizes of components for descriptive convenience and clarity only. The terms used herein are defined in consideration of their functions in the embodiments of the present disclosure, and may differ depending on the custom or intention of a user or operator. Therefore, the definitions should be based on the overall contents of this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Figure 1:
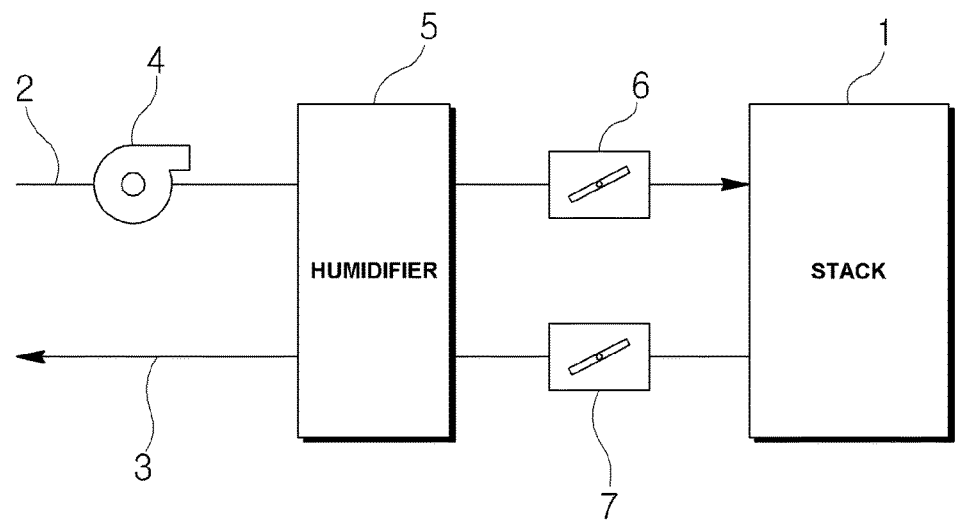
FIG. 1 is an exemplary schematic diagram illustrating air supply and discharge paths of a fuel cell stack according to the related art.
Figure 2:
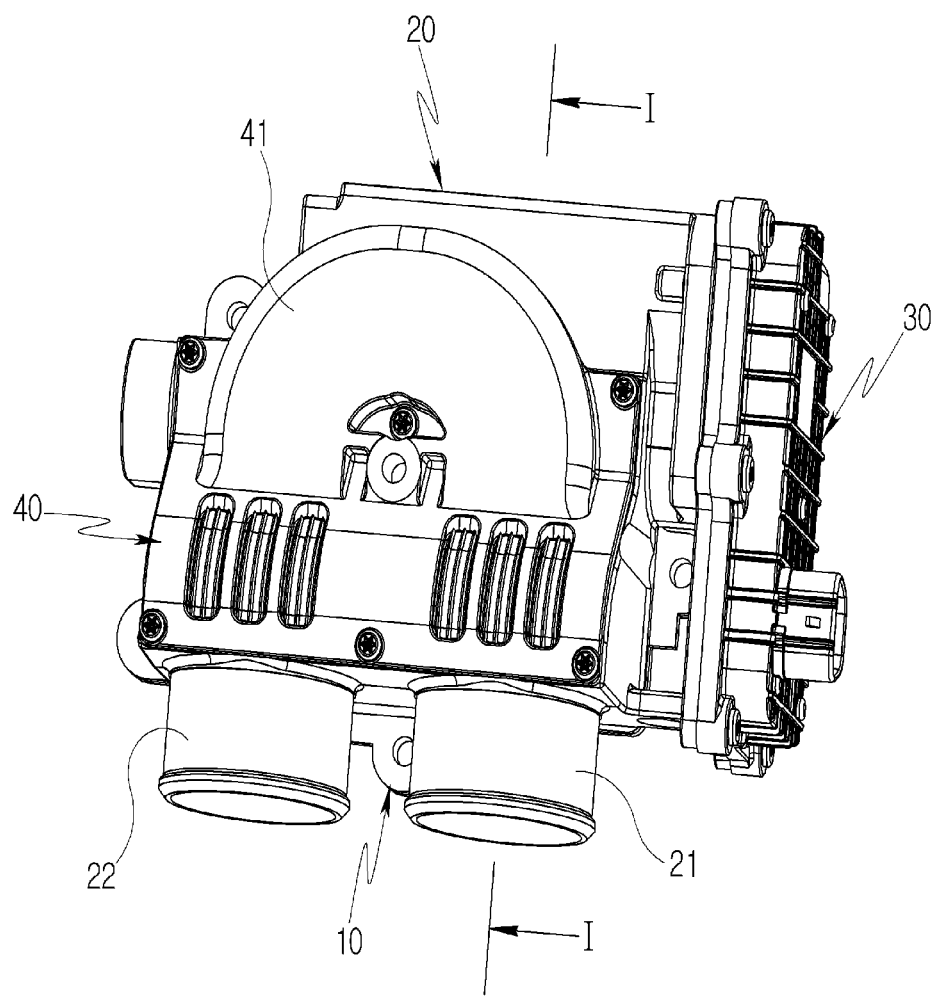
FIG. 2 is an exemplary perspective view of an air cut-off valve module according to an exemplary embodiment of the present disclosure.
Figure 3:
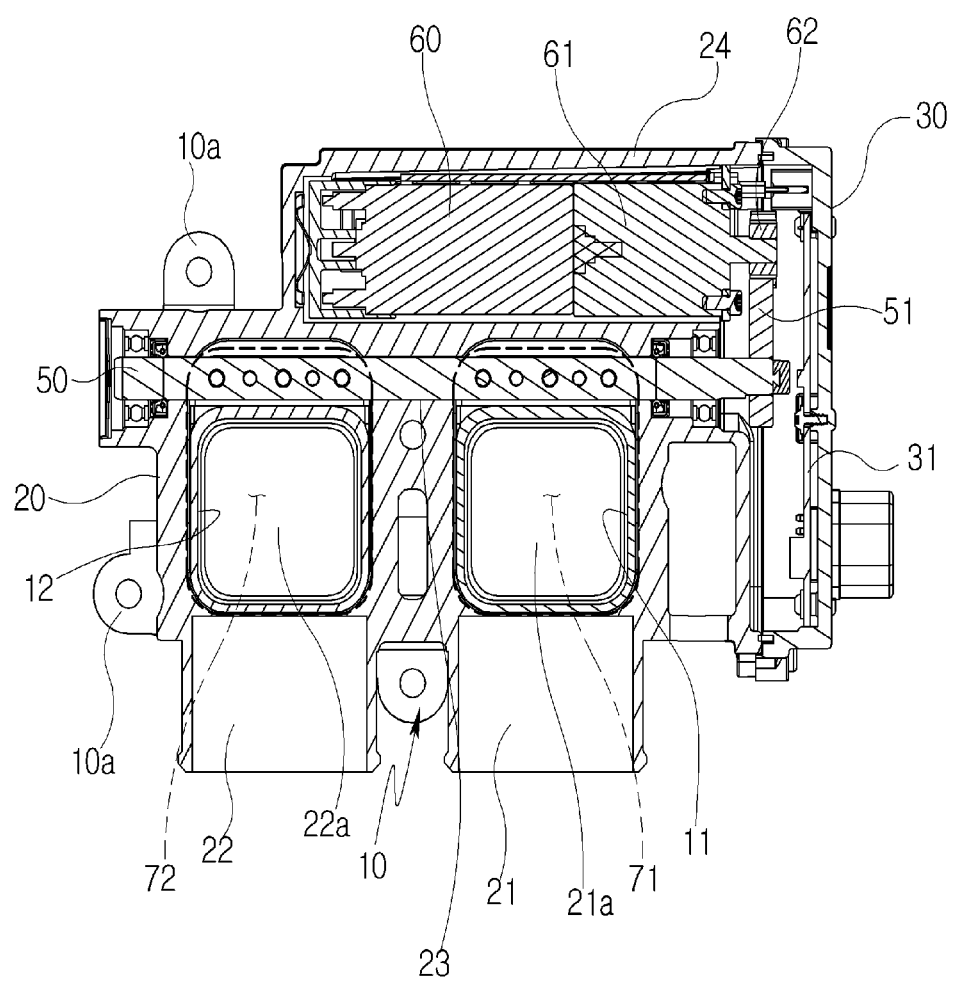
FIG. 3 is an exemplary longitudinal cross-sectional view of the air cut-off valve module illustrating the internal structure of the air cut-off valve module according to the exemplary embodiment of the present disclosure.
Figure 4:
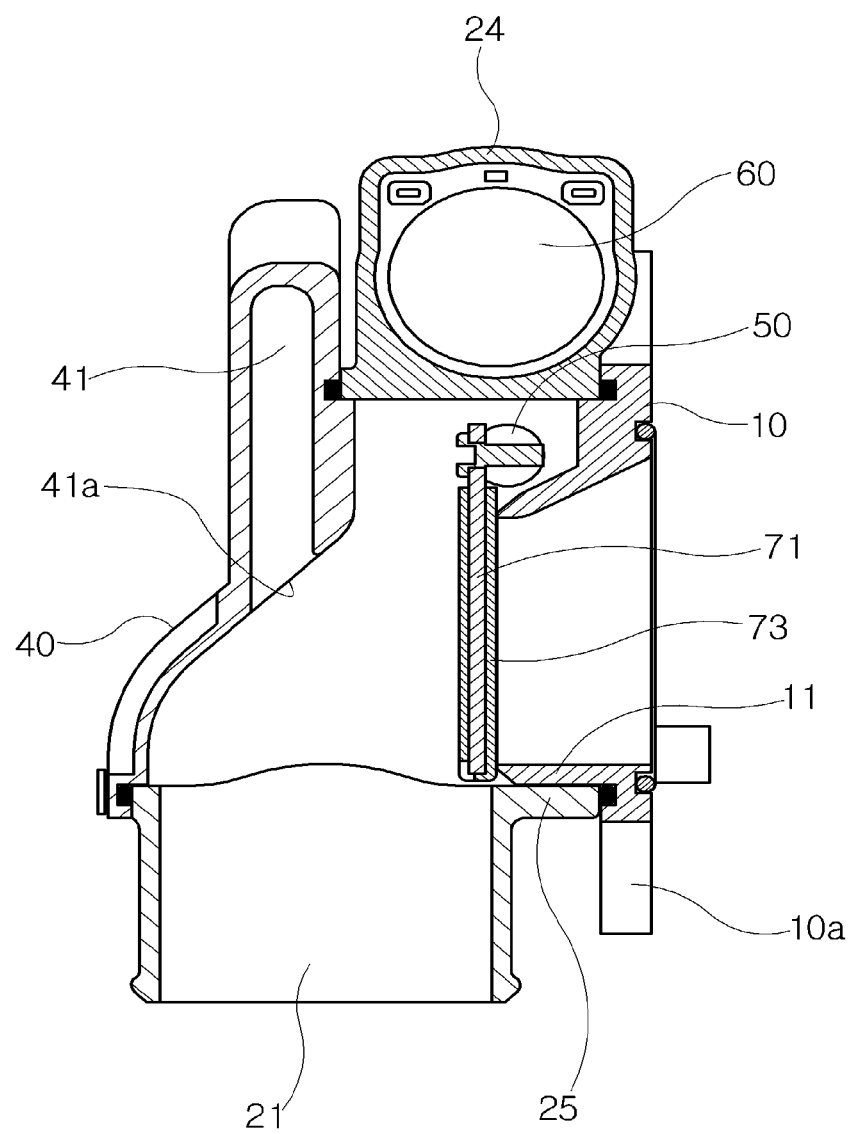
FIG. 4 is an exemplary cross-sectional views taken along the line I-I of FIG. 2 that illustrates that the air cut-off valve blocks an inlet and outlet of a sub housing according to an exemplary embodiment of the present disclosure.

Hereafter, exemplary embodiments of the present disclosure will be described in detail with reference to the accompanying drawings. As illustrated in FIGS. 2 to 4, the air cut-off valve module according to an exemplary embodiment may include a sub housing 10, a main housing 20, a controller 30, a housing cover 40, a shaft 50, a motor 60 and valve plates 71 and 72. The sub housing 10 may be a component for mounting (e.g., directly mounting) the module in a stack, and may form an air introduction path and an air discharge path with the main housing 20. The air introduction path and the air discharge path may be separated from each other.

The sub housing 10 may include a plurality of flanges 10a formed at the exterior edge thereof, and may be mounted on the stack through the plurality of flanges 10a. Each of the flanges 10a may include a bolt aperture for bolt mounting (e.g., or the like). The sub housing 10 may have an inlet 11 and outlet 12 formed therein, and the inlet 11 and the outlet 12 may be separated from each other by a partition. When the sub housing 10 is mounted in the stack, the inlet 11 and the outlet 12 may be connected to an inlet and outlet of an air electrode of the stack, respectively.

The main housing 20 may have an inlet pipe 21 coupled to an air introduction pipe and an outlet pipe 22 coupled to an air discharge pipe. The main housing 20 may have internal cavities 21a and 22a coupled to the inlet pipe 21 and the outlet pipe 22, respectively. The internal cavities 21a and 22a may be separated from each other by a partition. In other words, the inlet pipe-side cavity 21a connected to the inlet pipe 21 and the outlet pipe-side cavity 22a connected to the outlet pipe 22 may be separated from each other. Both of the cavities 21a and 22a may be opened through the rear surface of the main housing 20, at which the sub housing 10 is mounted. Additionally sub housing mounting components 25 (refer to FIG. 4) may be formed in a protrusion shape around the respective openings. The sub housing mounting components 25 may be formed in a shape into which the inlet 11 and the outlet 12 of the sub housing 10 is inserted. In other words, the mounting component 25 coupled to the inlet 11 of the sub housing 10 may be separated from the mounting component 25 coupled to the outlet 12 of the sub housing 10.

The inlet 11 and the outlet 12 of the sub housing 10 may be inserted into the mounting components 25, to expose the ends thereof to the cavities 21a and 22a of the main housing 20. In the module having the above-described structure, the air introduction path may be formed through the inlet pipe 21, the cavity 21a and the inlet 11, and the air discharge path may be formed through the outlet 12, the cavity 22a and the outlet pipe 22. As described above, the air introduction path and the discharge path may be separated from each other.

The main housing 20 may have a shaft 50 formed across one of the sides of the cavities 21a and 22a, and one of the sides of the cavities 21a and 22a may correspond to the opposite sides of the ends adjacent to the inlet pipe 21 and the outlet pipe 22. The partition for partitioning the cavities 21a and 22a from each other may have a shaft aperture 23 through which the shaft 50 is installed. Both ends of the shaft 50 may be supported by bearings disposed in the main housing 20.

The valve plates 71 and 72 may be mounted on the shaft 50 through screws (or the like). The valve plate 71 may obstruct the air introduction path, and the valve plate 72 may obstruct the air discharge path. The valve plates 71 and 72 may be rotated at similar angles in the cavities 21a and 22a by rotation of the shaft 50. In particular, to improve the sealing performance of the valve plates 71 and 72, a sealing member 73 formed from a plastic material may be coupled to the surfaces of the valve plates 71 and 72 (refer to FIG. 4).

The main housing 20 may have a motor insertion component 24 formed at one side thereof. The motor 60 may be inserted into the motor insertion component 24. The one side of the main housing 20 may correspond to the opposition side of the positions at which the inlet pipe 21 and the outlet pipe 22 are formed. For example, a gear set 61 may be embedded in the main housing 20 with the motor 60. The gear set 61 may reduce the number of revolutions of the motor 60 while increasing the torque of the motor 60. The gear set 61 may include a planetary gear set. The motor 60 (e.g., the gear set 61) may include a pinion gear 62 disposed on an output shaft thereof, and the shaft 50 may have a segment gear 51 disposed at one end thereof. The pinion gear 62 and the segment gear 51 may be engaged with each other. Therefore, the rotational force of the motor 60 may be transferred to the shaft 50 to rotate the shaft 50 in either direction based on the operation direction of the motor 60.

The controller 30 may be disposed at another side of the main housing 20. The controller 30 may be configured to control the operation of the motor 60. The controller 30 may be configured to operate the motor 60 based on an on or off state of the stack while communicating with a fuel cell control unit (FCU), and may be configured to operate the valve plates 71 and 72 to open or close the air introduction path and the air discharge path. For such an electronic control operation, a control circuit board 31 may be disposed in the controller 30.

The front surface of the main housing 20 may be opened to assemble the valve plates 71 and 72 to the shaft 50, and the housing cover 40 may be positioned to obstruct the opening. The front surface of the main housing 20 may correspond to the opposite surface of the surface at which the sub housing 10 is mounted. The housing cover 40 may have a U-shaped bypass flow path 41 formed therein. The bypass flow path 41 may connect the inlet pipe-side cavity 21a and the outlet pipe-side cavity 22a in the main housing 20.

Hereafter, the operation of the air cut-off valve module according to an exemplary embodiment of the present disclosure will be described. The valve plates 71 and 72 may be rotated with the shaft 50 rotated by the motor 60, and may open or close the air introduction flow path, the air discharge flow path and the bypass flow path 41. The motor 60 may be rotated in the forward or reverse direction by the controller 30.

As illustrated in FIG. 4, the valve plates 71 and 72 may be rotated with the shaft 50 when the motor 60 is operated. FIG. 4 is an exemplary cross-sectional view taken along the I-I line of FIG. 2. FIG. 4 illustrates the valve plate 71 at the air introduction flow path. However, the opposite valve plate 72 at the air discharge path may be operated in a similar manner. When the valve plates 71 and 72 are rotated toward the sub housing 10, the valve plates 71 and 72 may contact the ends of the inlet 11 and the outlet 12 of the sub housing 10, and may obstruct the inlet 11 and the outlet 12, thereby obstructing the air introduction path and the air discharge path.

Figure 5:
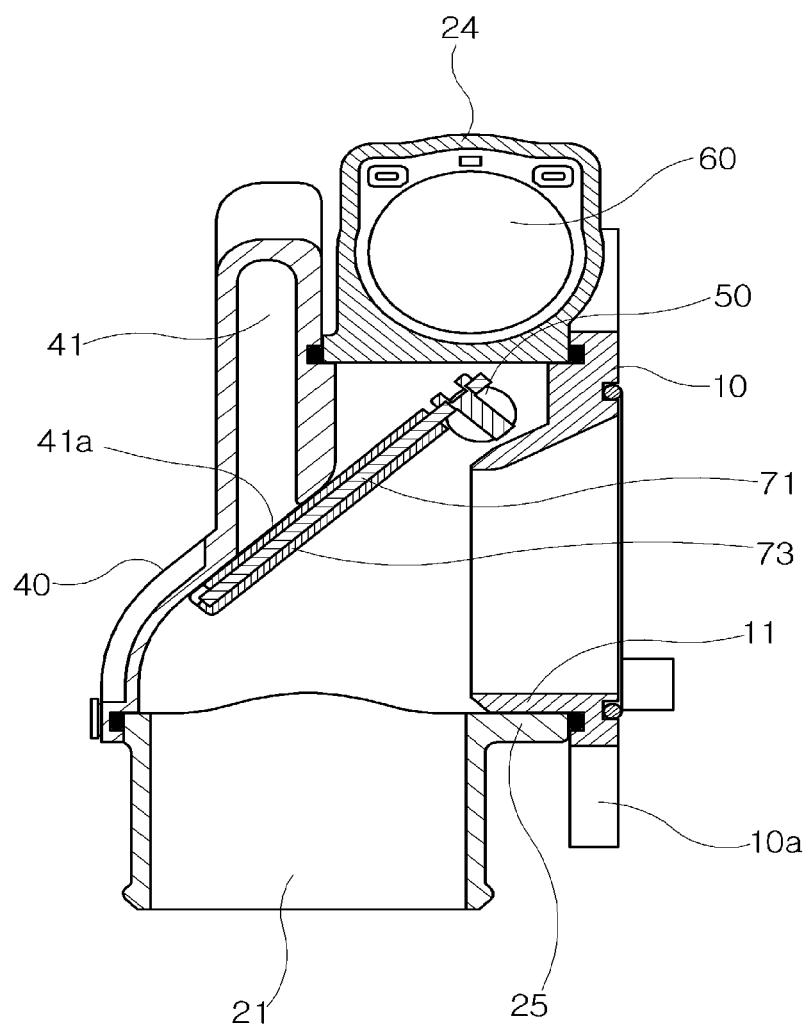
FIG. 5 is an exemplary cross-sectional views taken along the line I-I of FIG. 2 that illustrates that the air cut-off valve blocks a bypass flow path of a housing cover according to an exemplary embodiment of the present disclosure.

As illustrated in FIG. 5, when the valve plates 71 and 72 are rotated toward the housing cover 40, the valve plates 71 and 72 may obstruct an inlet 41a and outlet of the bypass flow path 41, thereby obstructing the bypass flow path 41 with respect to the air introduction path and the air discharge path. Although the outlet of the bypass flow path 41 is not illustrated in FIG. 5, the bypass flow path 41 may have the outlet coupled to the outlet pipe-side cavity 22a of the main housing 20.

Figure 6:
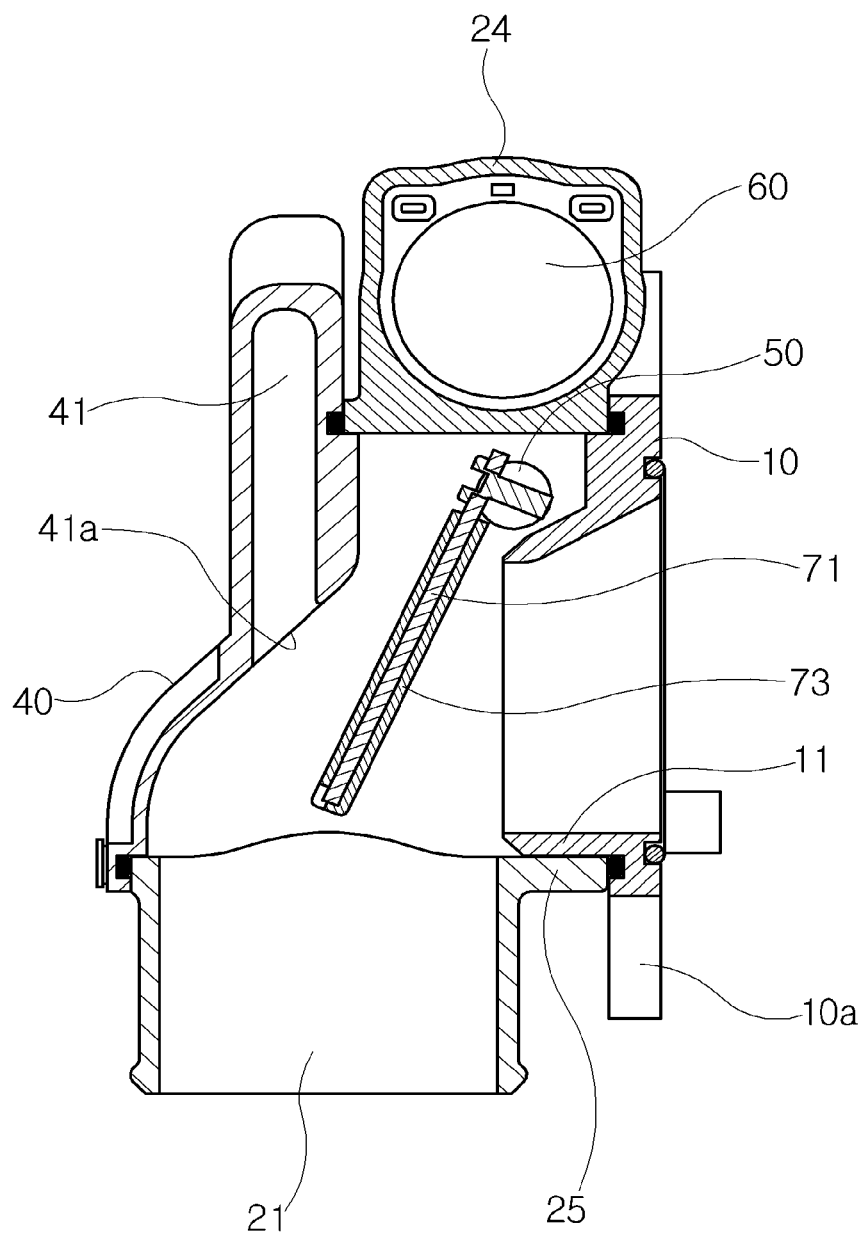
FIG. 6 is an exemplary cross-sectional views taken along the line I-I of FIG. 2 that illustrates that the air cut-off valve opens the inlet outlet of the sub housing and opens the bypass flow path of the housing cover according to an exemplary embodiment of the present disclosure.

As illustrated in FIG. 6, the opening degree of the valve plates 71 and 72 may be freely controlled through an operation amount of the motor 60. In particular, the opening degree of the valve plates 71 and 72 may range from the position at which the valve plates 71 and 72 obstruct the inlet 11 and the outlet 12 of the sub housing 10 to the position at which the valve plates 71 and 72 obstruct the inlet 41a and the outlet of the bypass flow path 41. Based on the opening degree of the valve plates 71 and 72, the amount of air introduced into or discharged from the stack and the bypass flow rate may be adjusted when necessary.

In the air cut-off valve module according to an exemplary embodiment of the present disclosure, the air introduction path and the air discharge path may be formed adjacent to each other. The valve plates 71 and 72 for opening or closing the air introduction path and the air discharge path, respectively, may be operated by one motor 60 and one shaft 50. In particular, the valve plates 71 and 72 of the air introduction path and the air discharge path may be operated by the same driving mechanism. Furthermore, both of the shaft 50 and the motor 60 may be disposed in the main housing 20 that forms the module. The controller 30 for operating the motor 60 may be disposed at the side of the main housing 20. Therefore, the components related to the air cut-off valve for blocking the air introduction pipe and the air discharge pipe of the stack may be constructed as one compact module. Thus, the layout around the stack of the fuel cell vehicle may be further simplified, and a resultant available cavity may be utilized for arranging other devices.

Furthermore, in the air cut-off valve module, the sub housing 10 may be connected (e.g., directly connected) to the air inlet and the air outlet of the stack. Thus, when the air introduction path and the air discharge path are obstructed in the state of FIG. 4 by a shutdown of the stack, short paths may be formed from the position obstructed by the valve plate 71 and 72 to the stack. Therefore, the air present in the paths may not be diffused and introduced into the air electrode of the stack, which may prevent a reduction in durability of the stack by an unnecessary reaction during a shutdown.

The air cut-off valve module may control the valve plates 71 and 72 to obstruct the inlet 11 and the outlet 12 of the sub housing 10 when the stack is shut down. Then, when the stack is started, the air cut-off valve module may control the valve plates 71 and 72 to be opened at a predetermined angle as illustrated in FIG. 6. Accordingly, the introduced air may be bypassed through the bypass flow path 41. In particular, the valve plate 72 may open the outlet 12 of the sub housing 10, to discharge the hydrogen remaining in the stack to the outlet pipe-side cavity 22a through the outlet 12. At this time, the air which that has not passed through the stack but was bypassed to the cavity 22a from the inlet pipe-side cavity 21a through the bypass flow path 41 may be mixed with the hydrogen gas. The hydrogen concentration of the final exhaust gas discharged through the air discharge pipe may be reduced.

Figure 7:
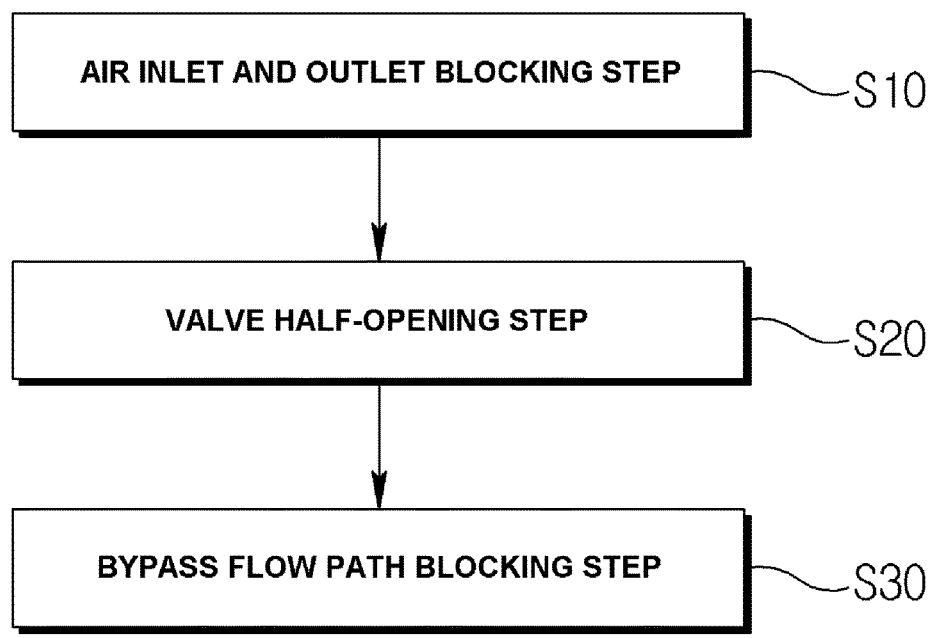
FIG. 7 is an exemplary block diagram illustrating a control method of an air cut-off valve module according to an exemplary embodiment of the present disclosure.

Hereafter, a control method of the air cut-off valve module for reducing the hydrogen concentration of exhaust gas will be described in detail. As illustrated in FIG. 7, the control method of the air cut-off valve module according to an exemplary embodiment of the present disclosure may include obstructing an air inlet and an air outlet (e.g., an air inlet and outlet blocking step) S10, partially (e.g., half) opening a valve (e.g., half-opening step) S20 and obstructing a bypass flow path (e.g., a bypass flow path blocking step) S30.

For example, obstructing the air inlet and outlet S10 may performed while the operation of the stack is shut down. When the air inlet and outlet are obstructed S10, the controller 30 receiving stack operation shutdown information from the FCU may be configured to operate the motor 60 to rotate the valve plates 71 and 72 toward the sub housing 10 as illustrated in FIG. 4, in order to obstruct the inlet 11 and the outlet 12 of the sub housing 10. The natural role of the air cut-off valve may be conducted, and an introduction of air into the stack from outside during the shutdown of the stack may be obstructed to prevent an unnecessary reaction in the stack.

Then, when the stack is started, partially opening a valve S20 may be performed to open the valve plates 71 and 72 at a predetermined angle. In this state, the compressor disposed on the air introduction pipe may be operated. Therefore, outside air may be introduced through the inlet pipe 21, and supplied to the stack through the opened inlet 11 of the sub housing 10. Then, the hydrogen-containing air in the stack may be discharged to the outlet pipe-side cavity 22a of the main housing 20 through the outlet 12 of the sub housing 10. In particular, when the bypass flow path 41 is opened by the half-opened valve plates 71 and 72, the air of the inlet pipe-side cavity 21a of the main housing 20 may be bypassed through the bypass flow path 41, and discharged (e.g., directly discharged) to the outlet pipe-side cavity 22a. Therefore, the hydrogen-containing air discharged through the outlet 12 of the sub housing 10 may be mixed with the bypassed air to reduce the hydrogen concentration.

Accordingly, when the stack is started, the valve plates 71 and 72 may be controlled to be partially opened in order to secure a bypass flow rate. Thus, the air discharged from the stack may be diluted to reduce the hydrogen concentration. Therefore, as the opening degree of the valve plates 71 and 72 is properly adjusted to control the bypass flow rate, the hydrogen concentration of exhaust gas during a startup of the stack may be reduced to less than the regulation standard (e.g., typically 4%).

When the valve is partially opened S20, the air is supplied into the stack through the opened inlet 11 of the sub housing 10, and lowers the hydrogen concentration by diluting the internal air of the stack. When the stack startup process is terminated, the bypass flow path obstruction S30 may be performed. When the bypass flow path is obstructed S30, the controller 30 may be configured to operate the motor 60 to rotate (e.g., completely rotate) the valve plates 71 and 72 to the housing cover 40. Thus, the inlet 41a and the outlet of the bypass flow path 41 may be obstructed by the valve plates 71 and 72.

While the stack is normally operated, the discharge of hydrogen through the air discharge path may be reduced, and a large amount of air (oxygen) may be required for a reaction in the stack. Therefore, obstructing bypass flow path S30 may be performed to obstruct the bypass flow path 41 while completely opening the inlet 11 and the outlet 12 of the sub housing 10. Thus, the air introduced from outside may be supplied to the stack, and the air discharged from the stack may also be more smoothly discharged.

Before partially opening the valve S20, a hydrogen purge system disposed in the fuel cell system may be operated to purge hydrogen from the stack. When the hydrogen purge is performed, the hydrogen in the stack may be removed to further reduce the hydrogen content of the air discharged through the air electrode-side outlet, even though a small amount of hydrogen is reduced. Therefore, the hydrogen concentration of exhaust gas may be more effectively reduced. In accordance with an exemplary embodiments of the present disclosure, the cut-off valve of the air introduction pipe, the cut-off valve of the air discharge pipe, the driving mechanisms including the motor for driving the valves, and the controller may be formed as one module. Therefore, the components related to the air cut-off valve of the stack may be formed as a compact module.

Furthermore, since the sub housing of the module may be directly mounted on the stack, a distance between the air cut-off valve and the stack is reduced (e.g., may be extremely short). Thus, when the operation of the stack is stopped, a reduction in durability of the stack, which may occur due to the air between the air cut-off value and the stack may be prevented. Furthermore, the air cut-off valve module may include the bypass flow path formed adjacent to the air cut-off valve and may connect the air introduction path and the air discharge path. Therefore, when the stack is started, introduced air may be bypassed through the bypass flow path, and dilute hydrogen gas discharged through the air discharge flow path, thereby reducing the concentration of the hydrogen gas.

While the present disclosure has been described with respect to exemplary embodiments, it will be apparent to those skilled in the art that various changes and modifications may be made without departing from the spirit and scope of the disclosure as defined in the following claims.

What is claimed is:

1. An air cut-off valve module of a vehicle fuel cell system having a fuel cell stack disposed therein, comprising:
   a sub housing having an air inlet and an air outlet separated from each other, and mounted in the stack to position the air inlet and the air outlet of the sub housing to align with an air inlet and the air outlet of the stack;
   a main housing coupled to the sub housing, having an inlet pipe-side cavity in communication with the air inlet and an outlet pipe-side cavity to provide communication with the outlet of the sub housing, respectively, and including an inlet pipe and outlet pipe in communication with the respective cavities;
   a housing cover mounted on the main housing, and having a bypass flow path that connects the inlet pipe-side cavity and the outlet pipe-side cavity; and
   a plurality of valve plates disposed in the inlet pipe-side cavity and the outlet pipe-side cavity of the main housing, respectively, and opening and closing the inlet and outlet of the sub housing and an inlet and outlet of the bypass flow path,
   wherein when the stack is stopped, the inlet and outlet of the sub housing are obstructed by the valve plates, and
   wherein when the stack is started, the valve plates are partially opened, and the inlet and outlet of the sub housing and the inlet and outlet of the bypass flow path are opened.

2. The air cut-off valve module of claim 1, wherein the inlet pipe-side cavity and the outlet pipe-side cavity are opened through a rear surface of the main housing, sub housing mounting components protrude from edges of the respective openings, and the inlet and outlet of the sub housing are inserted into the respective sub housing mounting components and exposed to the inlet pipe-side cavity and the outlet pipe-side cavity.

3. The air cut-off valve module of claim 1, further comprising:
   a shaft installed through the inlet pipe-side cavity and the outlet pipe-side cavity of the main housing,
   wherein the valve plates are disposed on the shaft.

4. The air cut-off valve module of claim 3, wherein the main housing has a motor insertion component formed at one side thereof, and a motor for driving the valve plates through the shaft is inserted into the motor insertion component.

5. The air cut-off valve module of claim 4, wherein the motor has a pinion gear disposed on an output shaft thereof, and the shaft has a segment gear disposed at one end thereof, the segment gear being engaged with the pinion gear.

6. The air cut-off valve module of claim 4, wherein the motor has an output shaft coupled to a gear set that reduces the number of rotations and increases a torque, the gear set has a pinion gear disposed on an output shaft thereof, and the shaft has a segment gear disposed at one end thereof, the segment gear being engaged with the pinion gear.

7. The air cut-off valve module of claim 6, wherein the gear set includes a planetary gear set.

8. The air cut-off valve module of claim 4, further comprising:
   a controller disposed at one side of the main housing and configured to control the operation of the motor while communicating with a fuel cell control unit of the vehicle fuel cell system.

9. The air cut-off valve module of claim 1, wherein the valve plates have a sealing member attached thereon.

10. The air cut-off valve module of claim 1, wherein after the stack startup is terminated, the motor is driven to control the valve plates to obstruct the inlet and outlet of the bypass flow path to supply air introduced from an exterior to the stack through the inlet of the sub housing.

11. A control method of an air cut-off valve module of a vehicle fuel cell system having a fuel cell stack installed therein, comprising:
    obstructing an air inlet and an air outlet when a motor is driven to control valve plates to obstruct an inlet and outlet of a sub housing, when the stack is stopped; and
    partially opening a valve when the motor is driven to partially open the valve plates when the stack is started, and the inlet and outlet of the sub housing and a bypass flow path are opened to bypass a portion of air introduced from an exterior to mix the bypassed air with air discharged from the outlet of the sub housing and reduces the hydrogen concentration of exhaust gas.

12. The control method of claim 11, further comprising:
    obstructing a bypass flow path when after the stack startup is terminated, the motor is driven to control the valve plates to obstruct the inlet and outlet of the bypass flow path to supply the air introduced from outside to the stack through the inlet of the sub housing.

13. The control method of claim 11, wherein hydrogen of the stack is purged between obstructing the air inlet and outlet and partially opening the valve.

* * * * *